Feb. 2, 1960
R. KISSEL
2,923,755
PYROMETER OF THE SUCTION TYPE
Filed Dec. 18, 1956
2 Sheets-Sheet 1
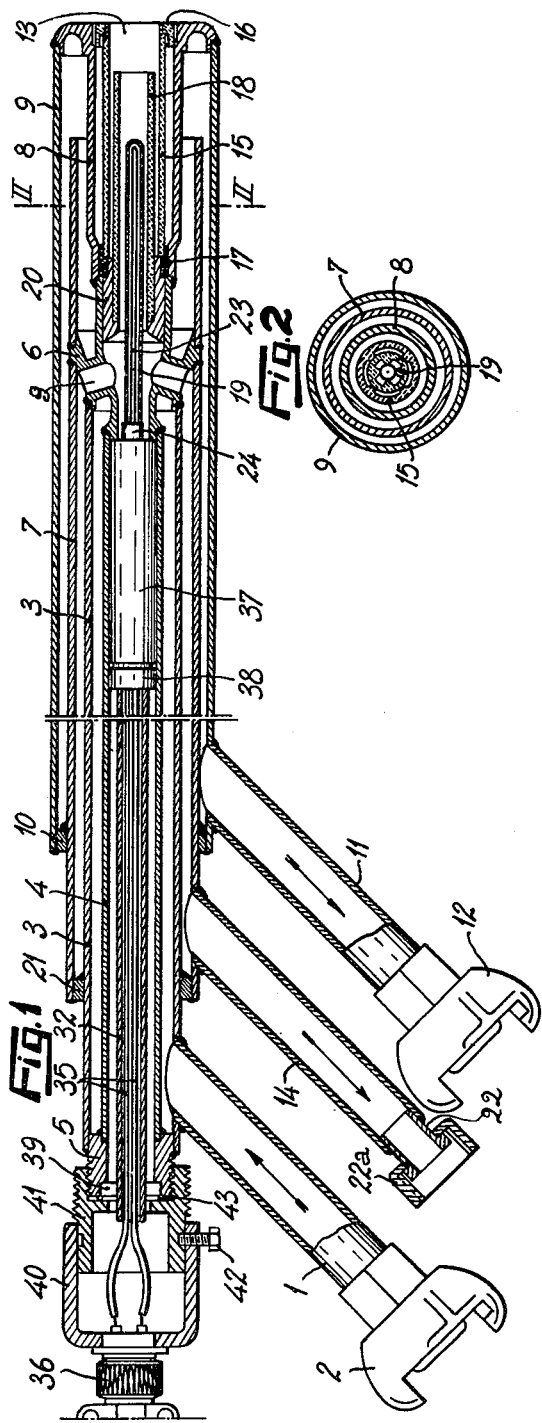
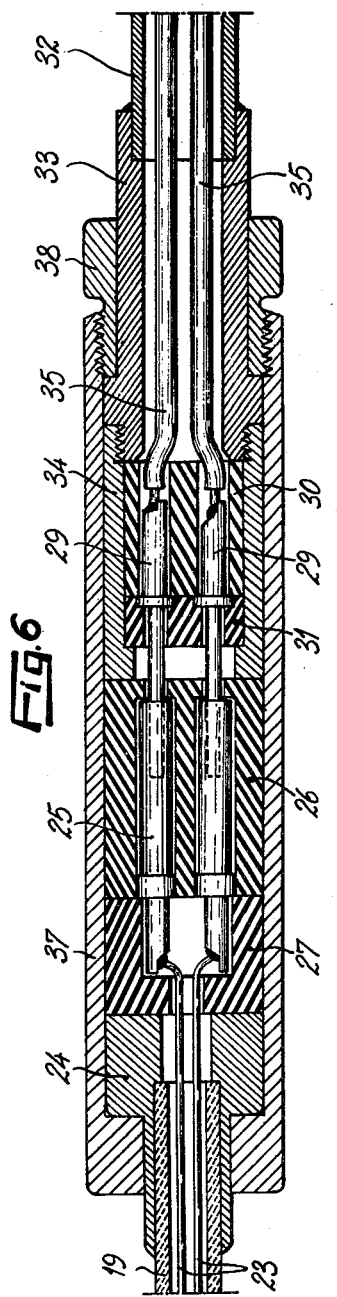
INVENTOR
Roland Kissel
by A. John Michel
ATTORNEY Feb. 2, 1960 R. KISSEL 2,923,755
PYROMETER OF THE SUCTION TYPE
Filed Dec. 18, 1956 2 Sheets-Sheet 2
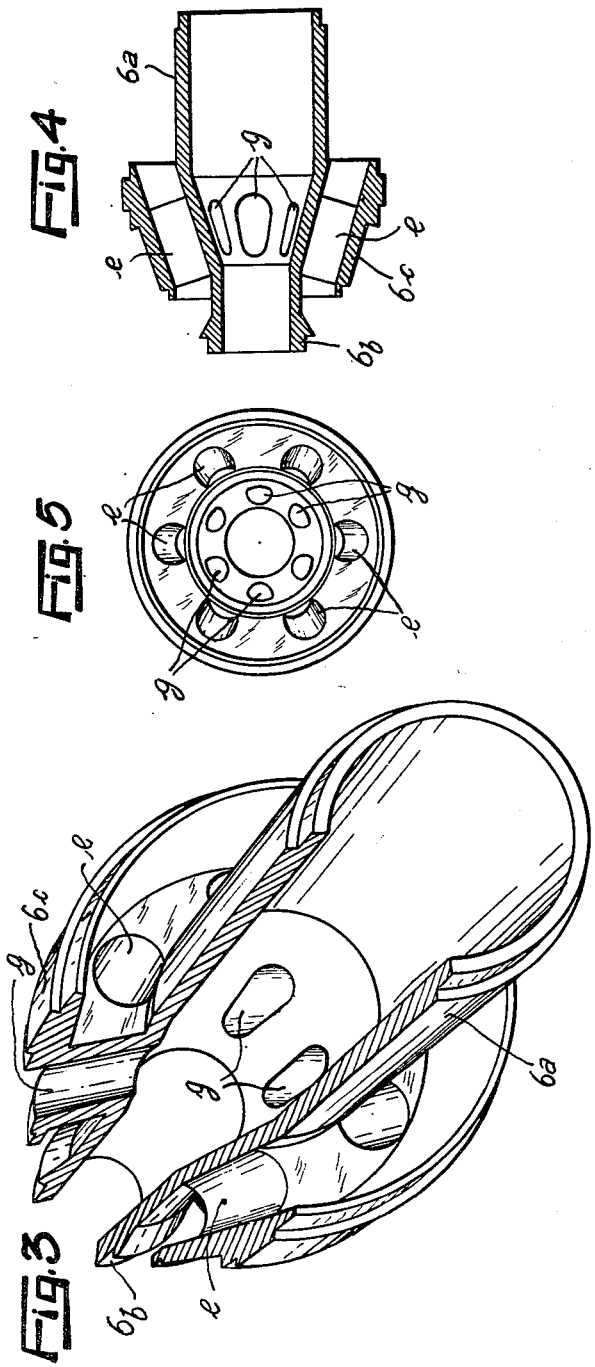
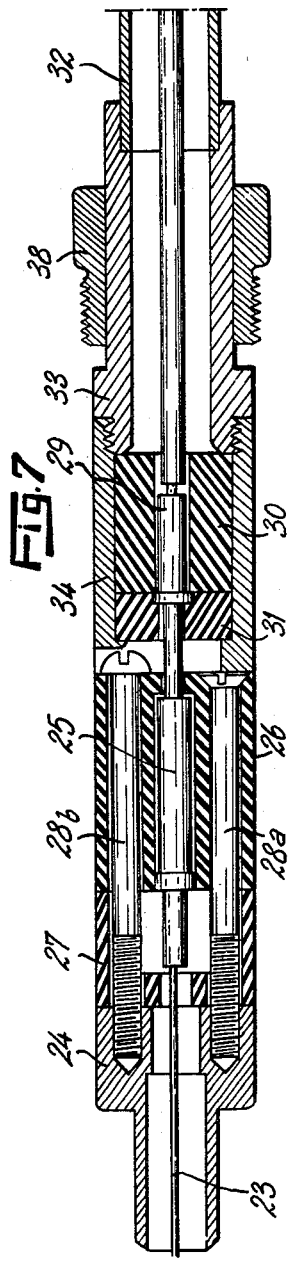
INVENTOR
Roland Kissel
by A. John Michel
ATTORNEY

United States Patent Office 2,923,755
Patented Feb. 2, 1960

2,923,755

PYROMETER OF THE SUCTION TYPE

Roland Kissel, Le Vesinet, France, assignor to Institut de Recherches de la Siderurgie, Saint-Germain-en-Laye, France, a professional institution of France Application December 18, 1956, Serial No. 629,164

Claims priority, application France December 22, 1955

9 Claims. (Cl. 136—4)

Thermocouples have been used to measure the temperature of gases by introducing bare metallic couples inside gasiform streams. It has been found, however, that factors such as radiations, or the poisoning of the couples by the surrounding atmosphere, detrimentally affect the accuracy of the temperature measurements obtained with such pyrometers to a very large extent. Various arrangements have been resorted to for reducing these parasitic influences and, to this end, suction type pyrometers have been built. Various pyrometers of this type have been proposed but all are based on the following fundamental principles.

A couple is separated from the gases by a protecting sheath made of refractory material while the radiations are cut off by a number of refractory or metallic screens of a more or less compound structure. Such an assembly produces a certain thermal inertia which may be reduced to a considerable extent by sucking the gases out of it so that the gases pass at a very high speed over the end of the couple protecting sheath.

Such apparatus and in particular the pyrometer of the suction type designed by the International Committee for the Investigation of the Radiations of Flames, which serves as a basic apparatus, show in spite of small improvements the same serious drawbacks: the temperature of the couple longitudinally of the apparatus is such that it is not possible to resort to a compensating wire and that the length of the precious metal, such as platinum or rhodium-containing platinum, is of the same magnitude as the length of the actual instrument. This leads to a number of detrimental consequences. Primarily, for normal temperatures of use of a couple constituted by platinum and rhodium-containing platinum in reducing gases such as carbon monoxide or in gases laden with sulfurous dust, the life of the couple is comparatively short and it is necessary to change very often thermo-couples of a substantial length. Furthermore, this operation which is costly by reason of the high consumption of platinum required can be executed only by skilled operators. In this respect, it should be considered that the difference in price between the new metal and the recovered metal is about 30% of the actual cost price of the new metal. Thus, in addition to the high expenditure involved by such a change, the above mentioned drawback renders the use of such an instrument hardly practical for normal measurements in industrial concerns.

When it is desired to reach temperatures above 1600° C., it is possible to operate in various manners. It is possible, for instance, to resort to a couple of platinum and platinum containing 10 to 13% of rhodium, the life of which is very short, thus further increasing the above-mentioned drawbacks. It is also possible to resort to special metal couples selected for high temperatures with refractories which are also of a special nature. In this case, the life of the couple increases but the expenditure involved is considerable and although the use of such couples is made easier the drawback of a high cost price remains.

Researchers of the International Committee for the Investigation of the Radiations of Flames have attempted to remedy these drawbacks by providing various arrangements for the suction circuit. For instance, they designed a suction circuit which is transversely shifted with reference to the tube through which the couple is introduced. However, this instrument is very heavy and becomes readily choked by dust as a consequence of the dissymmetric location of the elementary gaseous streams in the suction circuit.

The object of my invention is to remove the above mentioned drawbacks by substituting for the platinum other compensating wires and by cooling the electric circuit ahead of the instrument by a particular arrangement of the suction and cooling circuits.

To this end, my invention has for its object a pyrometer of the suction type, which includes a thermoelectric measuring couple arranged axially and suction and cooling parts arranged radially and symmetrically with reference to the axis of the instruments so that the electric circuit may be cooled ahead of the instrument. This arrangement makes it possible to use compensating wires while the circulation of the sucked in gases is effected readily without choking the channel inside the instrument.

According to a further object of my invention, an annular member with a plurality of channels for the gases and a further plurality of channels for the cooling water allows the sucked in gases and the cooled water to circulate radially and symmetrically without the circuits of the two fluids meeting each other.

According to a still further object of my invention, I provide a protecting sheath or tube for the thermoelectric couple and these two parts are designed so as to form together a single unit which may be readily changed through the front end of the instrument.

According to a still further object of my invention, I provide an electric circuit forming a further rigid disconnectable unit which may be removed easily through the rear of the instrument.

According to yet another object of my invention, the connection between the two above-mentioned units is ensured by means of jacks provided with silvered contact-pieces.

Further features and advantages of my invention will appear from the following description of an embodiment disclosed by way of exemplification and by no means in a limiting sense, said embodiment being illustrated diagrammatically in the accompanying drawings wherein:

Fig. 1 is a diagrammatic axial cross-section of a pyrometer according to my invention, said cross-section showing clearly the water and gas circuits.

Fig. 2 is a transverse cross-section along line II—II of Fig. 1.

Fig. 3 is a perspective view of the special annular member provided with six channels for the gases and with six channels for the cooling water.

Fig. 4 is an axial cross-section of said member.

Fig. 5 is an endwise view of said member as seen from the side through which the gases enter it and the water passes out of it.

Fig. 6 is an axial cross-section of the electric circuit.

Fig. 7 is a similar axial cross-sectional view of said circuit in a plane at 90° of the plane of Fig. 1.

The instrument illustrated is constituted by a plurality of coaxial water jackets protecting a thermoelectric measuring couple. I will describe in succession the three circuits carried by said instrument, to wit those for the cooling water, for the sucked in gases and the electric connections.

The water enters the apparatus through a pipe 1 provided with an outer connection 2 (Fig. 1), said pipe being preferably of stainless steel and opening into an annular conduit defined by the coaxial tubes 3 and 4 welded at one end to a common ring 5 and at the other end to a special member 6 which is illustrated in detail in Figs. 3, 4 and 5.

The water flows from the annular conduit through a bundle of cylindrical channels $e$ formed inside the special member 6 into an annular passageway defined by the tube 7 welded to the member 6 and the pipe 8 telescoped concentrically in tube 7. The water passes then into the further annular passageway defined by the tube 7 and the tube 9 concentrically surrounding tube 7, said tube 7 opening at its end into the annular chamber defined between the forwardly projecting ends of the tubes 8 and 9, which latter are rigidly connected with the inner and the outer periphery respectively of a terminal closing ring while the rear ends of the tubes 7 and 9 are interconnected by the terminal ring 10. The water passing between the tubes 7 and 9 passes finally out of the instrument through the pipe 11 connected to a rubber hose by coupling 12.

The gas conduit appears also clearly in Fig. 1. Under the action of an aspirator or the like apparatus producing a reduction in pressure, the gases entering the pyrometer at 13 are sucked out through the pipe 14. The inlet 13 of the gases is shown to be constituted by a refractory sheath 15 secured centrally of the instrument by means of the two rings 16 and 17 located at each end of said sheath. A second refractory sheath 18 subdivides the gasiform stream into two concentric sections: the outer gasiform stream section flows between the sheaths 15 and 18 at a temperature approximating that of the incoming gases while the central stream section heats the actual couple-protecting sheath 19 inside it. The sheath 18 is held in the desired centered position by four fins 20 located along the arms of a geometrical cross and rigid with or welded to the ring 17. The gases pass over the couple-protecting sheath 19 into the channels $g$ extending through the annular member 6, said channels being in the shape of flattened cylinders beyond which the gases enter an annular conduit extending between the tubes 3 and 7, the outer ends of which are welded to a ring 21. The gases pass finally out through the tube 14 to which is welded a ring 22 engaged by a knurled nut 22a which serves for connecting said tube 14 either directly with the aspirator or with a metal channel leading to suction means.

The annular member 6 which allows the bundle of gas-guiding channels $g$ to pass through the tubular system of water feeding channels $e$ without meeting the latter includes, as illustrated in Fig. 3, two terminal cylindrical connecting sections 6a and 6b and a main frustoconical intermediate section 6c which is provided on the one hand in parallelism with its generating lines with a plurality of cylindrical channels $e$ for the passage of water and, on the other hand, in a direction perpendicular to said generating lines with a plurality of outwardly directed channels $g$ in the shape of flattened cylinders through which the gases pass. The axes of the different channels $g$ and $e$ pass through the successive apices of a duodecagon inscribed inside the circle defined by the intersection of the two geometrical cones on which the axes of the channels of the two series of channels are located respectively.

The electric circuit is illustrated entirely in Figs. 1, 6 and 7. The two wires of the thermo-electric couple 23 extend through the couple-protecting sheath 19 made of sintered alumina or the like refractory material which is welded or secured in its turn inside a metal tube 24 and are hard soldered to two terminals 25 (Figs. 6 and 7) made of silvered brass. These two terminals are preferably electrically insulated by two coaxial members 26 and 27 arranged in alignment and made of insulating material resisting high temperatures, which coaxial members are secured in their turn to the tube 24 by means of two screws of which one 28a has a countersunk head while the other 28b has a rounded head, said screws serving also as polarity marks. The members 19, 23, 24, 25, 26, 27, 28a and 28b form a single unit when the screws 28a and 28b have been screwed into position. The male jacks 29 engaging the terminals 25 are insulated by coaxial aligned parts 30 and 31 made of insulating material resisting high temperatures and are secured to the tube 32 by tubular member 33 welded over one end of the tube and nut 34 screwed over the opposite end of member 33 and having a terminal collar engaging the part 31. Nut 34 is provided at its front end facing the inlet of the gases with a notch adapted to house, as shown in Fig. 7, the rounded head of the polarity marking screw 28b.

The compensating wires 35 are welded at one end to the male jacks 29 and at their other end to the current feeding plug 36 (Fig. 1). The system including the parts 30, 31, 33, 34 and 32 forms a further unit when the nut or tubular member 34 has been screwed into position.

The two units thus described may be assembled by engaging the jacks into the terminals 25 and the double unit thus obtained is protected against any possible condensation of vapors by the case 37 which is locked in position by a nut 38 and held furthermore fast inside the water jacket by a fastening of the ring 39 welded to the tube 32 (Fig. 1), as disclosed hereinafter. The current feeding plug 36 is screwed into the cap 40 which is secured in its turn to the annular nut-shaped member 41 by three screws 42. The ring 39 is held fast through a screwing down of the nut 41 over a packing 43 (Fig. 1).

Obviously, it is possible without departing from the scope of the invention as defined in the accompanying claims to design various modifications and improvements and also to resort to the use of equivalent parts or units for the different parts or units referred to. More generally, my invention is of course by no means limited to the embodiment disclosed and illustrated by way of a mere exemplification. Thus, the annular member 6, the structure of which has been disclosed hereinabove in full detail may be provided with different features within the scope of the accompanying claims.

What I claim is:

1. A pyrometer comprising a thermocouple having an operative forward end and lead wires for said thermocouple, two tubes arranged about said lead wires and defining therebetween an annular gas conduit, one end of said conduit being in communication with said forward end of the thermocouple, means for sucking gas through said conduit connected to its other end, a third tube arranged between the lead wires rearwardly of the forward end of the thermocouple and the inner one of the first-named tubes, the third tube and said inner tube defining an annular cooling medium conduit about said lead wires, a source of cooling medium connected to said latter conduit, a fourth tube arranged about the outer one of said first-named tubes and extending at least to the forward end of the thermocouple, the fourth tube and said outer tube defining another annular cooling medium conduit, a cooling medium outlet means connected to said latter conduit, and an annular connecting section establishing communication between said two cooling medium conduits and constituting a cooling medium conduit about said forward end of the thermocouple.

2. A pyrometer comprising a thermocouple having an operative forward end and lead wires for said thermocouple, a first concentric tube arranged about said lead wires rearwardly of said operative forward end of the thermocouple, a second concentric tube spaced from said first tube and defining therewith a first annual cooling medium conduit surrounding said lead wires, inlet means for supplying cooling medium to said first annular cooling medium conduit, a third concentric tube arranged about said second tube and defining therewith a first annular gas conduit, a refractory tube surrounding said operative forward end of the thermocouple and defining a second annular gas conduit therewith, conduit means establishing communication between said second and first gas conduits, means connected to said first gas conduit for sucking gas from said gas conduits, a fourth concentric tube arranged about the third tube and extending at least to the operative forward end of the thermocouple, the third and fourth tubes defining a second cooling medium conduit surrounding the first gas conduit, a cooling medium outlet means connected to the second cooling medium conduit, the forwardly extending portion of the fourth concentric tube defining a third cooling medium conduit surrounding the second gas conduit and in communication with the second cooling medium conduit, and conduit means establishing communication between said first and third cooling medium conduits.

3. The pyrometer of claim 2, wherein said conduit means establishing communication between said second and first gas conduits and said first and third cooling medium conduits, respectively, is an annular connecting member having a first series of passageways therethrough for establishing communication between said second and first gas conduits, and a second series of passageways for establishing communication between the first and third cooling medium conduits.

4. A pyrometer comprising a thermocouple having an operative forward end and lead wires for said thermocouple, a first concentric tube arranged about said lead wires rearwardly of said operative forward end of the thermocouple, a second concentric tube spaced from said first tube and defining therewith a first annular cooling medium conduit surrounding said lead wires, inlet means for supplying cooling medium to said first annular cooling medium conduit, a third concentric tube arranged about said second tube and defining therewith a first annular gas conduit, a refractory tube surrounding said operative forward end of the thermocouple and defining a second annular gas conduit therewith, an annular connecting member connected, respectively, to said first, second and third tubes and to said refractory tube, said connecting member including an intermediate frusto-conical section having a first series of longitudinally extending passageways therethrough in communication with said first cooling medium conduit and arranged alternately between said longitudinally extending passageways, a second series of transversely extending passageways establishing communication between said first and second gas conduits, means connected to said first gas conduit for sucking gas from said gas conduits, a fourth concentric tube arranged about the third tube and extending at least to the operative forward end of the thermocouple, the third and fourth tubes defining a second cooling medium conduit surrounding the first gas conduit, a cooling medium outlet means connected to the second cooling medium conduit, the forwardly extending portion of the fourth concentric tube defining a third cooling medium conduit surrounding the second gas conduit and in communication with the second cooling medium conduit, and said longitudinally extending passageways in the annular connecting member opening into said third cooling medium conduit to establish communication between the first and third cooling medium conduits.

5. The pyrometer of claim 4, wherein said annular connecting member has two end cylindrical sections, the longitudinally extending passageways are of circular cross section and parallel to the generatrix of the frusto-conical section, and the transversely extending passageways are of elongated cross section and perpendicular to the generatrix, the axes of the passageways of both series passing through successive apices of a duodecagon inscribed inside a circle defined by the intersection of the two geometrical cones on which the axes of the respective passageways of the two series are located.

6. The pyrometer of claim 2, comprising a covering sheath for the operative forward end of the thermocouple, means for rigidly interconnecting the sheath and the thermocouple to form one unit, jack means removably connected to said thermocouple unit and extending rearwardly thereof, said jack means being surrounded by the first cooling medium conduit, said lead wires being removably connected to said jack means and the jack means being electrically connected to the thermocouple for feeding electric current to the thermocouple.

7. The pyrometer of claim 6, comprising a plug for removably connecting the lead wires to the jack means, a carrier for the plug, said carrier being secured to the jack means to form another unit therewith, both of said units being surrounded by the first cooling medium conduit.

8. The pyrometer of claim 2, comprising silvered contact ends mechanically and electrically connected with the rear end of the thermocouple.

9. The pyrometer of claim 2, comprising a covering sheath for the operative forward end of the thermocouple, silvered contact ends mechanically and electrically connected with the rear end of the thermocouple, means for rigidly interconnecting the sheath and the thermocouple to form one unit, jack means holding said silvered contact ends and removably connected to the thermocouple unit, said jack means extending rearwardly therefor, a plug mechanically and electrically connected to the lead wires for removably connecting the lead wires to the jack means for feeding electric current to the thermocouple, and a carrier for the plug, the carrier being secured to the jack means to form another unit therewith, both of said units being surrounded by the first cooling medium.

References Cited in the file of this patent

UNITED STATES PATENTS

| | | |
|---|---|---|
| 2,400,021 | Podbielniak | May 7, 1946 |
| 2,534,448 | Jantsch | Dec. 19, 1950 |
| 2,669,593 | Larsen | Feb. 16, 1954 |
| 2,833,844 | Burton et al. | May 6, 1958 |